United States Patent [19]
Fell et al.

[11] Patent Number: 6,053,878
[45] Date of Patent: Apr. 25, 2000

[54] AUDITORY AND TACTILE FEEDBACK SYSTEM FOR PROMOTING DEVELOPMENT OF INDIVIDUALS

[75] Inventors: Harriet J. Fell, Newton; Linda J. Ferrier, Dover, both of Mass.

[73] Assignee: Northeastern University, Boston, Mass.

[21] Appl. No.: 08/827,869

[22] Filed: Apr. 11, 1997

Related U.S. Application Data

[60] Provisional application No. 60/015,191, Apr. 12, 1996.

[51] Int. Cl.[7] ...................................................... A61B 5/00
[52] U.S. Cl. ............................................................ 600/595
[58] Field of Search ................................... 600/587, 592, 600/595

[56] References Cited

U.S. PATENT DOCUMENTS

| | | | |
|---|---|---|---|
| 4,320,766 | 3/1982 | Alihanka et al. | 600/595 |
| 5,260,869 | 11/1993 | Ferrier et al. | 600/595 |
| 5,353,012 | 10/1994 | Barkham et al. | 600/595 |
| 5,588,439 | 12/1996 | Hollub | 600/595 |

*Primary Examiner*—Max Hindenburg
*Attorney, Agent, or Firm*—Weingarten, Schurgin, Gagnebin & Hayes LLP

[57] ABSTRACT

An auditory and tactile stimulation and feedback system for promoting development of individuals. The system stimulates attention and movement, helps individuals to learn cause and effect relationships, to control a surrounding environment and to promote normal development by facilitating the individual's exploration of a developmental sequence of sounds or other stimuli. The system includes an input device which can be interconnected electrically and physically with other input devices, all of which are responsive to the individual as the individual traverses the input devices.

19 Claims, 3 Drawing Sheets

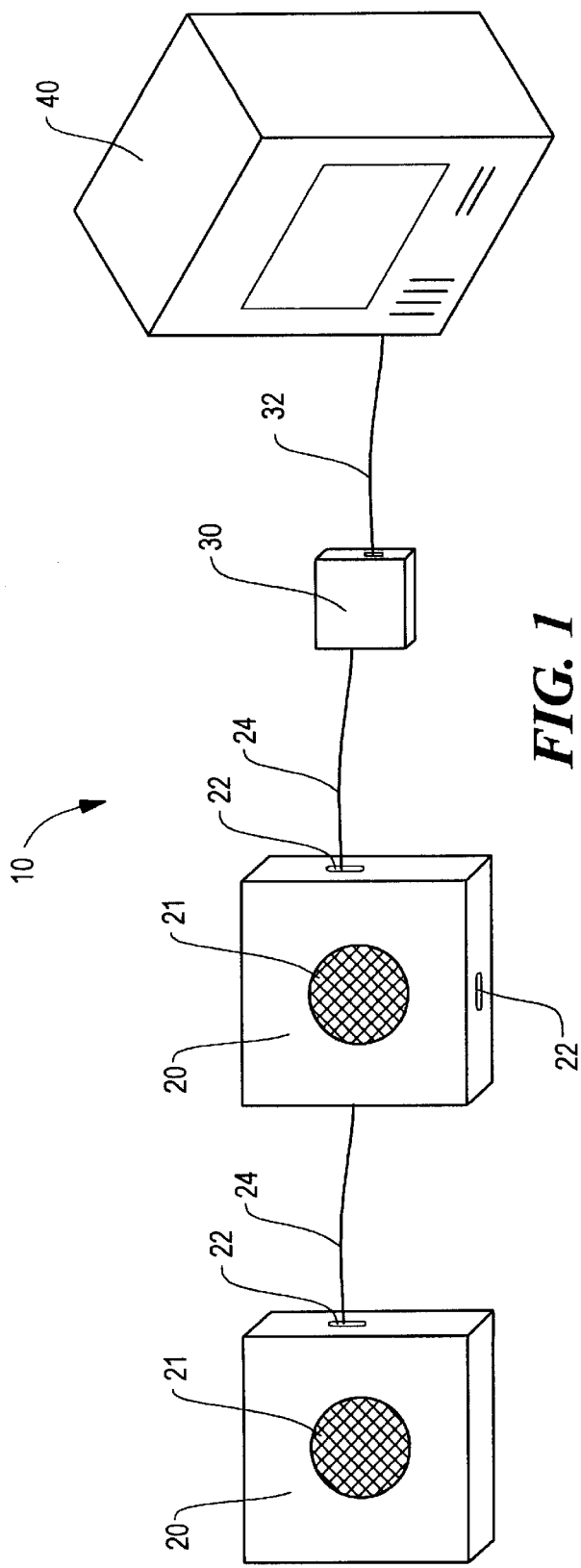
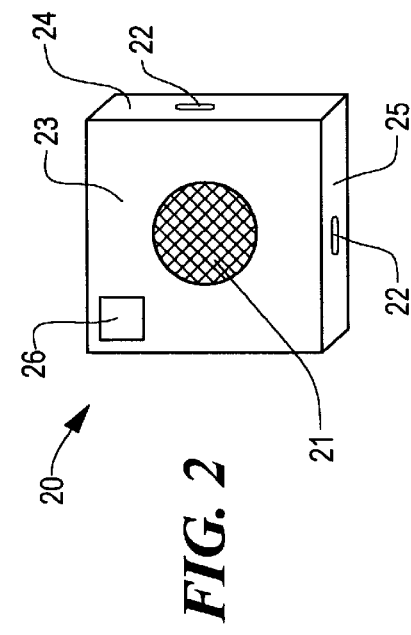
FIG. 1
FIG. 2

AUDITORY AND TACTILE FEEDBACK SYSTEM FOR PROMOTING DEVELOPMENT OF INDIVIDUALS

CROSS REFERENCE TO RELATED APPLICATIONS

This application claims priority under 35 U.S.C. § 119(e) to provisional application Ser. No. 60/015,191 filed on Apr. 12, 1996; the disclosure of which is incorporated herein by reference.

STATEMENT REGARDING FEDERALLY SPONSORED RESEARCH OR DEVELOPMENT

Not applicable

BACKGROUND OF THE INVENTION

Severely disabled infants, such as infants with cerebral palsy (CP) or blind infants, frequently grow up to become passive children with limited or nonexistent speech, even when the infant possesses apparently normal cognitive skills. The following factors have been proposed to explain this passivity: limited oral motor control and a consequent diminished repertoire of speech sounds; limited ability to control its physical environment by manual manipulation of objects; and consequent limited opportunity to engage caregivers in mutually enjoyable interaction.

The incidence of infants with CP is estimated to be at least one per thousand live births. Some CP infants are likely to suffer from diminished control of the vocal tract and the respiratory system upon which speech depends. These physically impaired infants are commonly described by their parents as "quiet babies". Without a means by which a CP can vocalize, the cognitive and emotional development of the infant is at risk.

Babbling in infancy has been studied, and it has been found that an infant progresses through an identifiable sequence of developmental stages characterized by babbles of increasing syllabic structure and segmental contrastivity. The infant's progression through these babbling stages is assumed to be partly dependent on maturational changes in the configuration of the infant's vocal tract, and partly upon changes in motor control. Babbling has not been found to be closely related to cognitive level. Of particular interest is the finding that deaf infants use manual babbles, i.e., repetitive movements similar to the canonical babbles used by infants learning speech. This finding indicates that there is an innate capacity to practice the motor movements for babbling, regardless of whether the infant is learning to interact via speech, manual signing, or other form of non-vocal communication, such as device-assisted communication. Thus, babbling appears to be a form of exploration and rehearsal of the particular communication mode that the infant is learning which is necessary for later phonological development. Furthermore, feedback has been found to be important to an infant's progression through the various stages of babbling. For example, an infant is reinforced by the sound of his or her own voice.

The social reinforcement that the infant receives in the second half of its first year appears critical to the development of a vocalic repertoire, and to an understanding of the "rules of conversation" that must be developed to achieve meaningful communication with parents or other caregivers. By vocalizing and using manual gestures and changes of facial expression, infants can elicit responses from caregivers. By responding to such communicative initiatives, parents or other caregivers reinforce these activities. Physically disabled infants are unable to control the motor systems upon which speech is dependent, or the manual systems for playing with objects or making gestures. Due to motor impairment, they may also show little facial affect. Consequently, they lack the means for providing consistent signals to their parents or other caregivers that are available to normal infants. Many physically impaired children require multi-modal stimulation that are tactile, visual and auditory. Different children dependant upon their particular disability will need different combinations of stimulation. As an example, blind children need encouragement to explore in a safe environment where they will not be hurt by bumping into furniture, walls, etc. Blind children would thus benefit from receiving tactile and auditory reinforcement. The activities of physically impaired individuals may appear to be random and difficult to read by caregivers. Accordingly, it is difficult to asses changes in behavior using traditional methods of data collection. As a result, caregivers are unable to discern patterns of behavior to which they can attach meaning and respond accordingly. Ultimately, physically disabled infants are likely to grow up passive and with a diminished motivation to learn.

By exploring their environment, normal infants gradually develop the concept that an action brings about a consequence. The infant's early attempts at vocalization may be seen as an exploration of cause and effect using the vocal mechanism. Actions such as banging and shaking are developed and reinforced by interesting consequences. Also, toys such as rattles and noise-makers are designed to help the child in his or her explorations of cause and effect relationships. However, physically disabled infants are frequently limited in their ability to explore the environment and to vocalize resulting in delayed or attenuated development.

BRIEF SUMMARY OF THE INVENTION

A system is disclosed for use by an infant or a physically disabled individual that includes an input device with an actuator element that is selectively responsive to gross physical movement of the individual; a stimulus device for initiating action by the individual; an output device for providing feedback to the individual and for communicating messages to others near the system; and an adaptive control unit. The adaptive control unit transforms information provided by the input device into control signals to the output device in accordance with a spatiotemporal pattern of activation of the actuator element of the input device. In one embodiment, the adaptive control unit also includes a test and measurement module for collecting statistical information based on patterns of activation of the input device. For example, by allowing an infant to use developing motor activity to activate various sound recordings, information can be obtained regarding the earliest age at which infants can be taught to understand cause and effect. The system of the invention is particularly suited to be operated by the earliest movements an infant can make, e.g., rolling, kicking, hitting, and other gross motor activities. Additionally, the input device can be fitted inside a crib or against a vertical surface that the infant can kick against.

The system can be used to help infants or physically impaired individuals communicate with others, such as parents or caregivers. It can also be used to learn cause and effect relationships, serving as both an educational aid and an amusement device. Additionally, it can promote normal development by facilitating the individual's exploration of a developmental sequence of babbling sounds, as well as providing a repertoire of simple spoken words, lights, vibrations and other stimuli, and thus also serves as a therapeutic aid by promoting normal physical, emotional, and cognitive development. In the embodiment that includes a testing module, the system is useful as a research or diagnostic tool. In an additional embodiment, the system allows the individual to control various aspects of its environment. The system can also be used with normal infants to assist in their development or to test and measure developmental performance.

BRIEF DESCRIPTION OF THE SEVERAL VIEWS OF THE DRAWING

The invention will be more fully understood from the following detailed description taken in conjunction with the accompanying drawings in which:

FIG. 1 is a diagram of the auditory and tactile feedback system of the present invention;

FIG. 2 is diagram of a modular input device;

DETAILED DESCRIPTION OF THE INVENTION

Figure 2A:
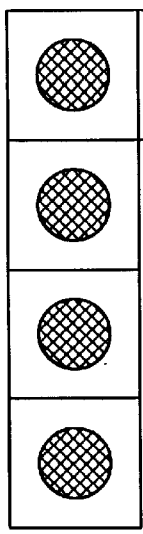
FIGS. 2A–2E are diagrams showing various configurations of the modular input devices.
Figure 2B:
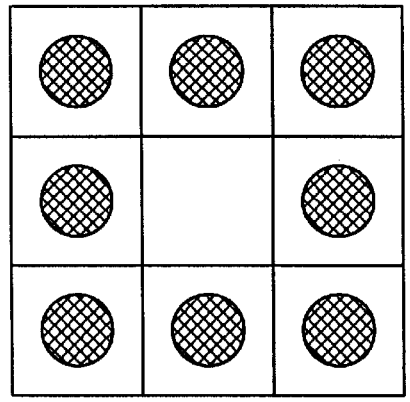
Figure 2D:
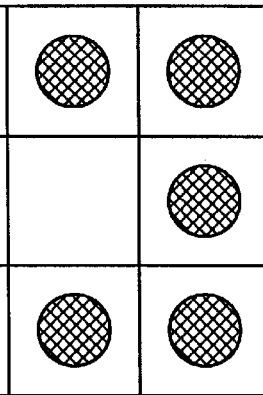
Figure 2C:
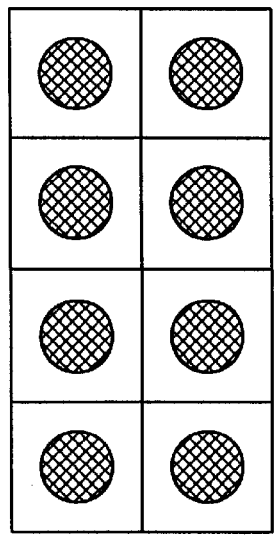
Figure 2E:
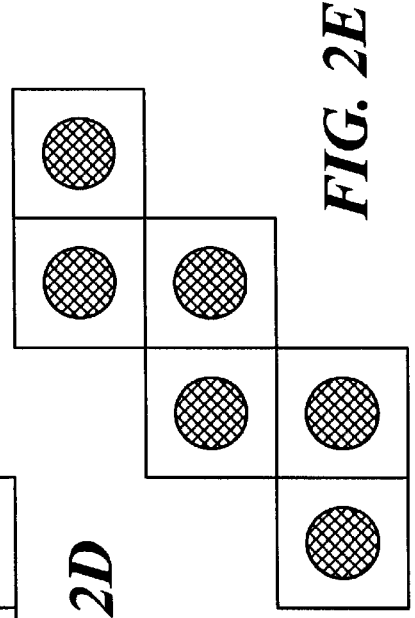

With reference to FIG. 1, the auditory and tactile feedback system for promoting development of individuals is shown. A communication and feedback system for promoting development of physically disadvantaged persons is disclosed in U.S. Pat. No. 5,260,869 to Ferrier et al., the disclosure of which is herein incorporated by reference. The present application is based on provisional application Ser. No. 60/015,191 filed on Apr. 12, 1996 which is herein incorporated by reference.

The auditory and tactile feedback system 10 includes an input device 20, including an actuator element 21, such as a microswitch, that is selectively responsive to gross physical movement of an individual, such as an infant or CP patient. Actuator element 21 is connected to an adaptive control unit 30 via a data interface line 24. The adaptive control unit 30 serves to transform information provided by the input device 20 to an output device 40, such as a personal computer with digital sound playback unit and a graphic display, by relating activation of the actuator element 21 to corresponding outputs, such as a sequence of canonical baby babbles, words, light, or vibration, as will be explained in further detail below. Each output device 40 serves to provide feedback to the individual that activates the system 10 using the input device 20, as well as serving to communicate messages from the individual to others. A stimulus device 26 is provided to initiate action by the individual.

Referring now to FIG. 2, the input device 20 in exemplary implementation is a pad 23 including a pressure sensitive switch 21 included therein. Other possible input devices include a pad having an alternate switch distribution; a joystick; a rollerball; a computer mouse; a data-glove such as one used with a so-called virtual reality apparatus; or any other device for sensing body movement and providing a signal indicative of such movement. In the embodiment of FIG. 2, the input device 20 is a generally flat device and includes a connector 22 on at least one side 24, 25 which allows for the input devices to be configured together and in electrical communication with each other when disposed adjacent each other, either by having a connector 22 of a first device mate directly with a cooperating connector of a second device or by interconnecting the connector of a first device to a second device via a cable 24. FIGS. 2A–2E show various combinations in which the input devices may be configured, though a multitude of other configurations may also be used.

In a particular example a blind baby is placed on a first input device of the system configured in a particular configuration, such as shown in FIG. 2A. Initially the blind baby may remain stationary, providing no movement or action. While prior art devices merely provide responses to movement, the present invention initiates action by stimulating the infant via the stimulus device. Once action is intitiated by the stimulus device 26, the infant moves, activating the actuator element and being rewarded by a response from the output device. A further benefit of the invention is provided by the modularity of the input devices, such that the system can be changed into various configurations to provide new learning opportunities to the infant and prevent boredom. The infant is thus challenged by learning different cause and effect relationships and exploration of the environment by the infant is reinforced.

The input device may also include a socket 26' for receiving a local output device. The local output device may be a vibration device, a light, a toy or a sound producing device. As such, a local stimulus is available to the individual in response to a local movement.

Alternative output devices include any other sound synthesis or playback device, as well as any video synthesis or playback device, such as a VCR or a videodisc player. Further output devices include a light, a vibration device, or a toy such as a rattle or noisemaker.

When calibrating the system 10, or when using the system as a research or diagnostic tool, a test and measurement unit (not shown), which can be a module within the adaptive control unit 30 or an output device such as a computer 40, can be used for collecting and storing statistical information based on patterns of activation of the actuator element 21 of the input device 20. Also, an audiovisual recording unit, e.g., a video camera/recorder, can be controlled by the test and measurement unit to record events associated with actuation of any of the actuator elements 21.

Referring back to FIG. 1, switch closure signals are received from the input devices 20 via adaptive control unit 30 and then a control program executed by the computer 40 interprets a pattern or sequence of microswitch actuations and executes a prescribed output sequence. For example, the computer will play different digitized babbles, depending on which switch is activated. The babbles are based on audio recordings of vocalizations of a normally developing infant. The developmental sophistication of the babbles can be increased over time to allow an expansion of the infant's repertoire in a time to developmentally normal fashion. The infant can also activate switches sequentially to produce repetitive babbled strings, or canonical babbles, and eventually words and sentences.

The computer 40 executes a control program that coordinates all input, output, and data collection activity. In particular, the software controls how each switch actuation results in communication with a caregiver or control of the individual's environment. The software must take into account the individual's position on the input device 20. Only switch actuations that result from volitional activity are of interest, so the caregiver interprets any continuous switch actuation that persists for more than a particular period of time, e.g., one minute, as being the result of the individuals resting his or her body on a microswitch 21 of the input device 20 as opposed to a intentional communicative or manipulative act. Therefore, signals that originate from a microswitch 21 that is pressed for more than a specified time will be ignored. Also, the caregiver monitors the frequency with which certain microswitches 21 are actuated, and assigns the microswitches according to the observed frequency of actuation of each microswitch. For example, if an individual is placed on a group of input devices in a position such that he or she rests primarily on the regions of a particular input device and that input device actuator element remains actuated beyond a preset limit, that actuator element would be disabled. In this position, the individual will tend to actuate a particular microswitch(es) more often than he or she will actuate the other microswitches, for example. The caregiver can also change the output associated with a microswitch if the frequency with which it is pressed changes. Furthermore, if the overall pattern of activation changes significantly, all previously disabled microswitches can be re-enabled. The caregiver then continues to monitor all of the microswitches so that upon any prolonged actuation of a microswitch, the caregiver would disable the switch, as before. It is important that involuntary movements not result in feedback. In one embodiment, a caregiver or experimental supervisor disables any microswitches that are actuated due to involuntary movements.

The outputs associated with the microswitches 21 can be selected to promote a particular outcome, such as behavior modification, therapeutic action, amusement, communication, or control of the individual's immediate environment. For example, if it is desired that the infant kick its legs, more pleasing sounds or light displays, for example, can be associated with microswitches disposed near the infant's legs, so as to reinforce that behavior. Alternatively, uninteresting consequences can follow from the infant pressing any switch associated with undesirable movements. To promote speech development and facilitate communication with a caregiver, as discussed above, actuation of various microswitches 21 can result in well defined and consistent consequences, such as playback of digitally recorded babbles, or simple words and phrases, in accordance with the infant's developmental stage. Additionally, certain microswitches can be associated with pleasing sound effects, music, the mother's voice, or a pleasing colorful video or light display. This feature provides amusement, as well as an enjoyable way to experience cause and effect relationships, and also builds the infant's sense of self-efficacy. Further, a particular microswitch can be associated with one or more environmental controls, such as room temperature or lighting; the infant could also control the location of various items in the room, such as the placement of a mobile. Of course, the function of each microswitch can also be assigned by a human supervisor based on observation of the infant's activity. Those skilled in the art will recognize that there are a prodigious variety of combinations and sequences of inputs, each of which can be associated with one or more of a virtually unlimited set of possible outcomes.

In a particular embodiment of the system a test and measurement module records and quantifies the type and number of switch activations over time. It also is cooperative with an audiovisual recording unit, such as a video camera/recorder, which records the interactions of the infant or patient with its mother or caregiver. The video camera/recorder is activated whenever a microswitch is actuated, and is turned off after a set interval of time transpires, e.g., five minutes, since the last microswitch activation event. Alternatively, the camera/recorder can be activated by a sonic activation device, incorporated within the camera/recorder which is responsive to sounds produced by the output device 40. Thus, an infant's own vocalizations and movements can be recorded, as well as its parent's spoken or non-verbal response. The video camera/recorder is reactivated upon any subsequent microswitch use. The test and measurement module 20 can be used to evaluate the effectiveness of a particular set outputs of the device, or the particular way spatiotemporal input patterns of activation of the microswitches are associated with particular outputs. First, spatiotemporal input patterns generated by the baby, without generating any associated outputs, are recorded by the module. Next, the system is configured such that spatiotemporal input patterns cause audiovisual outputs to be generated in response to the input patterns, and the resulting microswitch activation activity is recorded by the module. Last, the system is reconfigured so that outputs are no longer generated in response to microswitch actuation. In an effective system configuration, associating audiovisual output with spatiotemporal input patterns will increase the frequency with which the microswitches are actuated.

Figure 3:
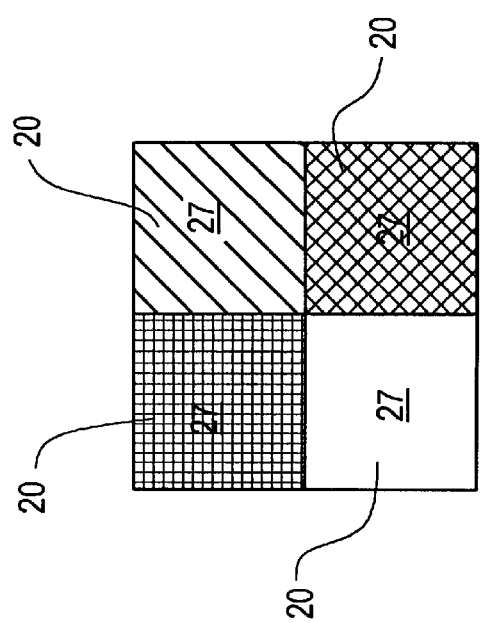
FIG. 3 is a diagram of a textured group of input devices.

In an additional embodiment, shown in FIG. 3, the input device may include a textured surface 27 such as silk, satin, denim, corduroy or other material. The textured surface maybe fixed to the input device or removable from the input device. With a configuration of input devices having a plurality of textured surfaces 27 immediate tactile feedback is provided to the individual as he or she comes into contact with various input device surfaces.

Figure 4:
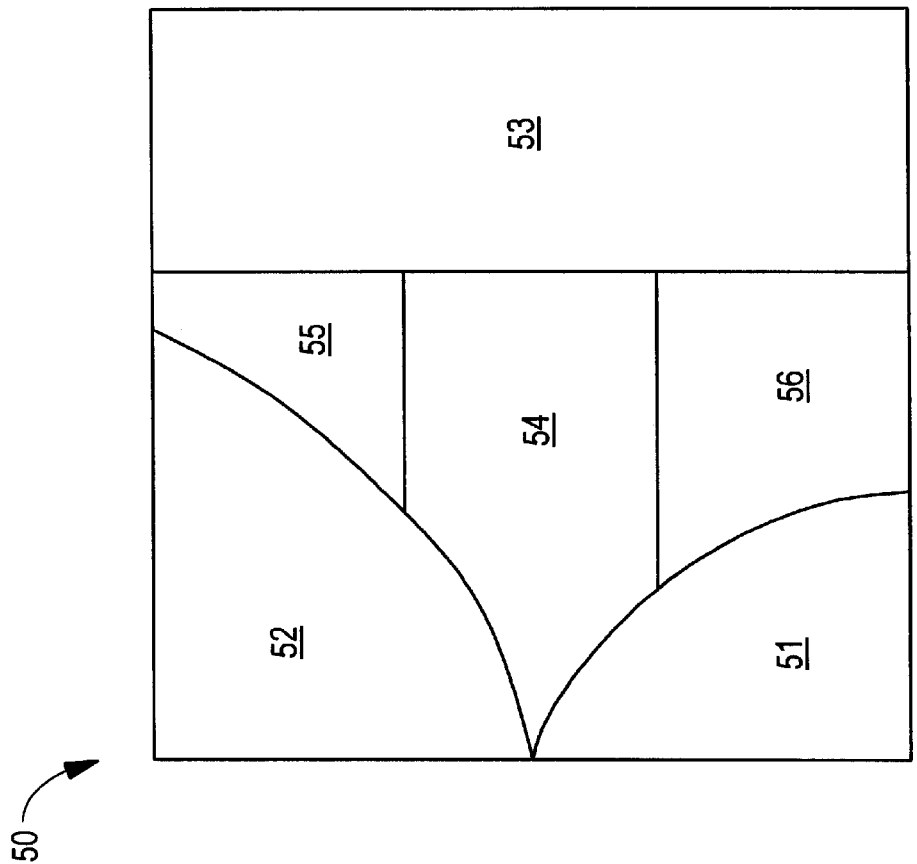
FIG. 4 is a diagram of a configurable input device.

An alternate embodiment of an input device 50 is shown in FIG. 4. Input device 50 includes a plurality of actuator elements which are software configurable to provide sections 51–55 which are actuated independently of one another. Under software control the input device 50 can be reconfigured such that different actuator elements are now in different sections which are activated independently from one another. For example, if input device 50 contains a plurality of switches and the software has grouped switches 1–4 into group A, while grouping switches 5–8 into group B, the configuration can be changed such that switches 1–3 are grouped into group A while switches 4–8 are grouped into group B. The software is able to determine which switches were activated and to correlate the activated switch with its software configurable section. Additionally, the pressure required to activate an actuator element can be changed under software control such that the system can be configured for various sizes and types of individuals.

The present invention provides a multifunctional, modular, programmable device for aiding the development of physically disadvantaged individuals. The invention provides local stimulus and response as well as multimodal stimuli and responses and is adaptable to work with individuals of various maturity, sizes and capabilities.

Having described preferred embodiments of the invention it will now become apparent to those of ordinary skill in the art that other embodiments incorporating these concepts may be used. Accordingly, it is submitted that the invention should be limited only by the spirit and scope of the appended claims.

We claim:

1. An auditory and tactile stimulus and feedback system for promoting development of individuals comprising:

an input device including an actuator element selectively responsive to gross physical movement of an individual;

a stimulus device operative to initiate the gross physical movement of the individual and to provide feedback to the individual; and an adaptive control including a control program having instructions in electrical communication with said input device and in electrical communication with said stimulus device for receiving information provided by said stimulus device according to said control program to initiate the gross physical movement of the individual and to provide feedback in accordance with a spatiotemporal pattern of activation of said actuator element by the individual according to said control program.

2. The system of claim 1 further comprising a responsive device in electrical communication with said adaptive control unit operative to provide feedback to the individual.

3. The system of claim 1 wherein said adaptive control unit further includes a test and measurement module operative to collect statistical information based on a pattern of activation of said input device.

4. The system of claim 3 wherein said test and measurement module includes an audiovisual recording unit.

5. The system of claim 1 wherein said actuator element of said input device comprises a pressure activated switch disposed within said input device.

6. The system device of claim 5 wherein said input device is flat and pliable.

7. The system of claim 1 wherein said input device has a textured surface.

8. The system of claim 2 wherein said responsive device comprises a computer monitor.

9. The system of claim 1 wherein said stimulus device provides prerecorded vocalizations corresponding to various stages of normal infant development.

10. The system of claim 1 wherein said stimulus device provides prerecorded words and phrases.

11. The system of claim 2 wherein said responsive device displays graphic information and emits sound intended to amuse and educate the individual.

12. The system of claim 1 wherein said stimulus device comprises a vibrating member.

13. The system of claim 1 wherein said stimulus device comprises a light.

14. The system of claim 1 wherein said stimulus device comprises an activatable toy.

15. The system of claim 1 wherein said adaptive control unit includes instructions to disable said actuator element in accordance with said spatiotemporal pattern of actuation of said actuator element.

16. The system of claim 1 wherein said adaptive control unit includes instructions to enable said actuator element in response to a new spatiotemporal pattern of actuation.

17. The system of claim 1 wherein said input device is modular and is electrically communicatable with a second input device disposed adjacent thereto.

18. The system of claim 1 wherein said input device comprises a plurality of actuator elements configurable into different sections corresponding to different areas of said input device, the adaptive control unit including instructions to configure said plurality of actuator elements.

19. The system of claim 18 wherein said actuator elements are configurable to be responsive to different pressures provided by the gross physical movement of an individual, the adaptive control unit including instructions to configure said plurality of actuator elements.

* * * * *